Figure 1:
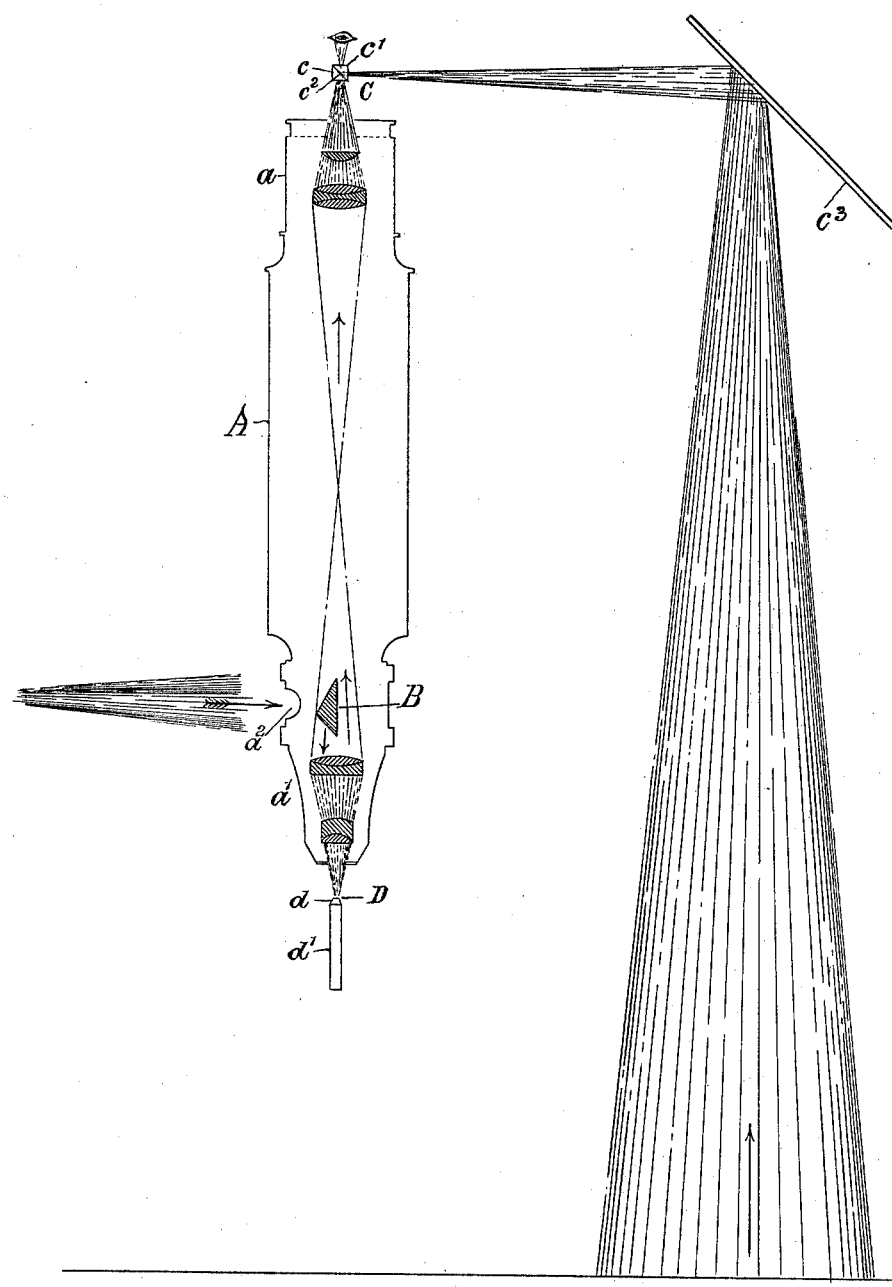

(No Model.)  5 Sheets—Sheet 1.

F. H. PIERPONT.
APPARATUS FOR FACILITATING DELINEATION OF OUTLINES OF TYPE FACES, &c.

No. 600,292.  Patented Mar. 8, 1898.

Witnesses:
E. B. Bolton
A. S. Busing

Inventor:
Frank Harrison Pierpont.
By Richards
his Attorneys.

(No Model.)                                                5 Sheets—Sheet 2.
F. H. PIERPONT.
APPARATUS FOR FACILITATING DELINEATION OF OUTLINES OF TYPE FACES, &c.
No. 600,292.                                       Patented Mar. 8, 1898.
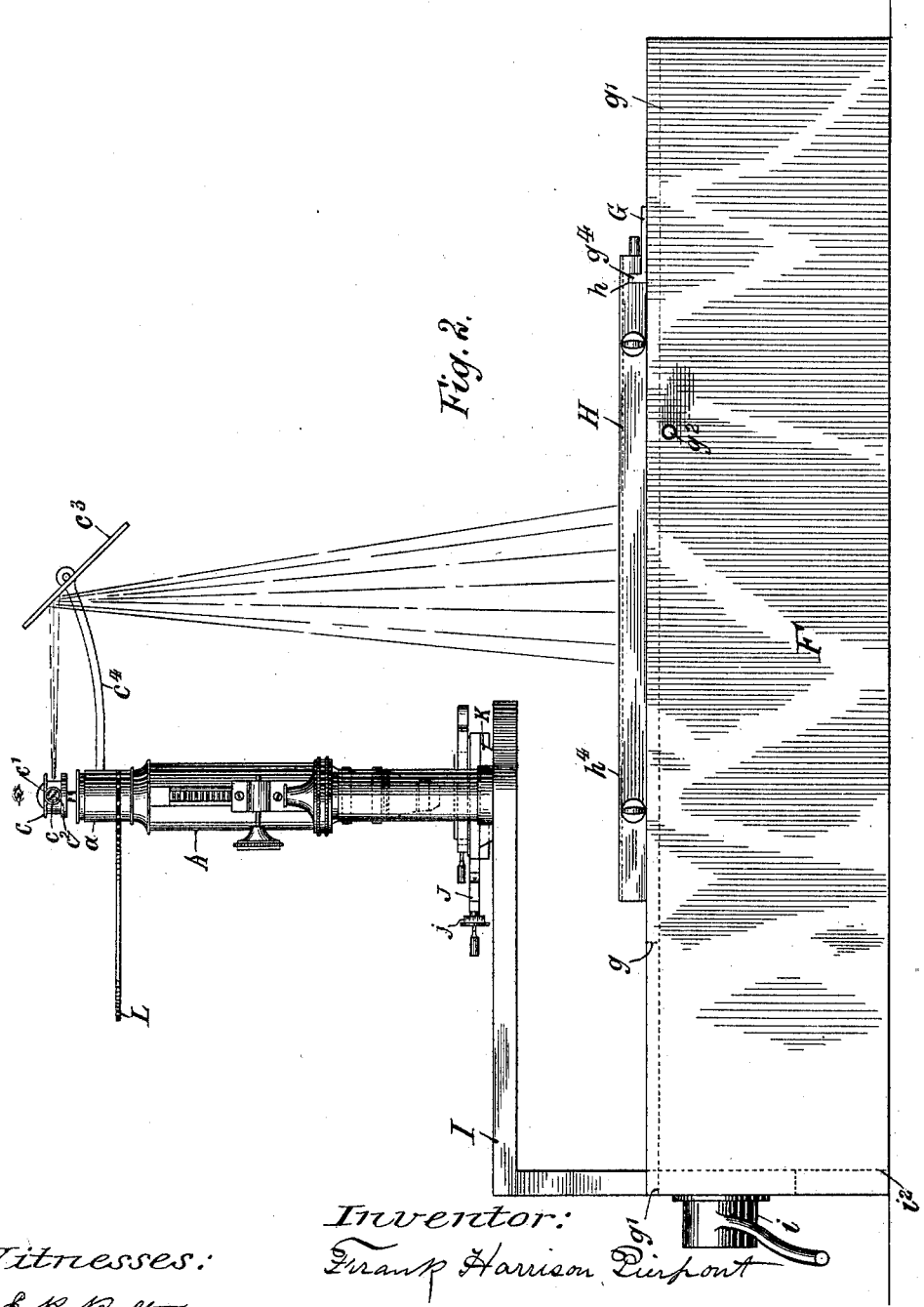

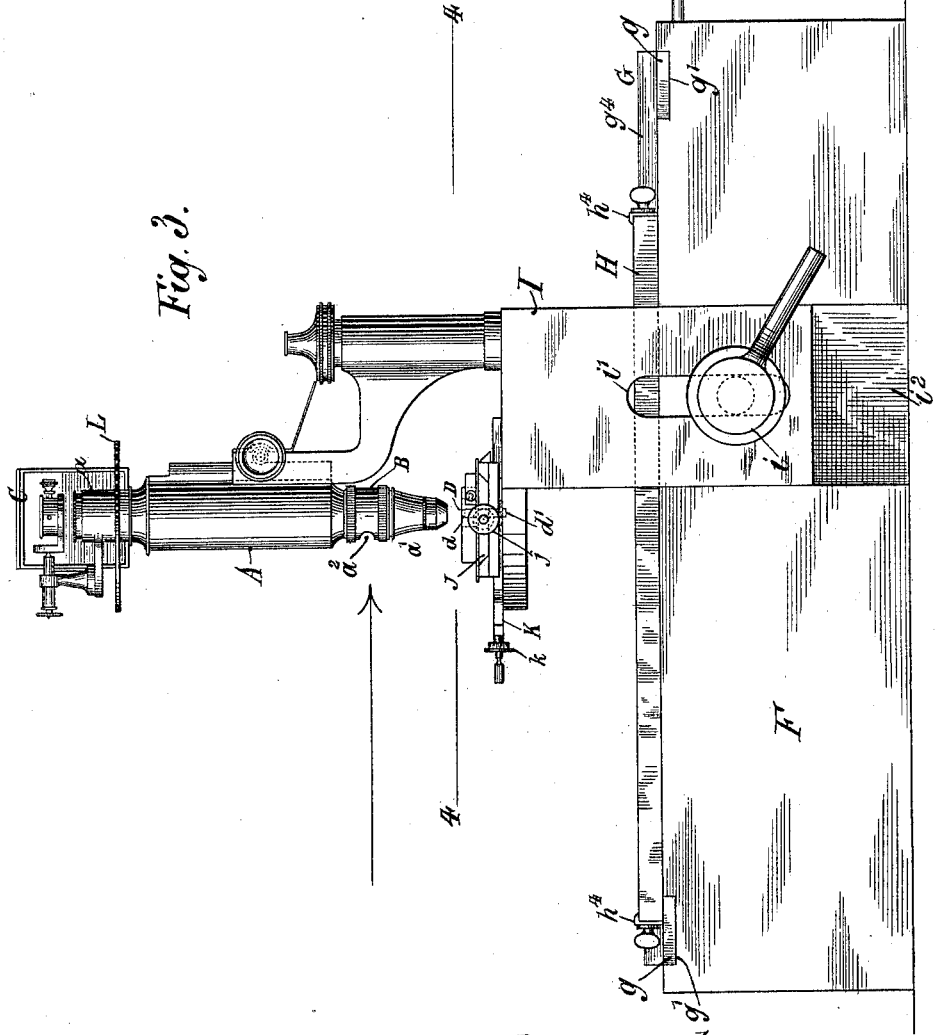

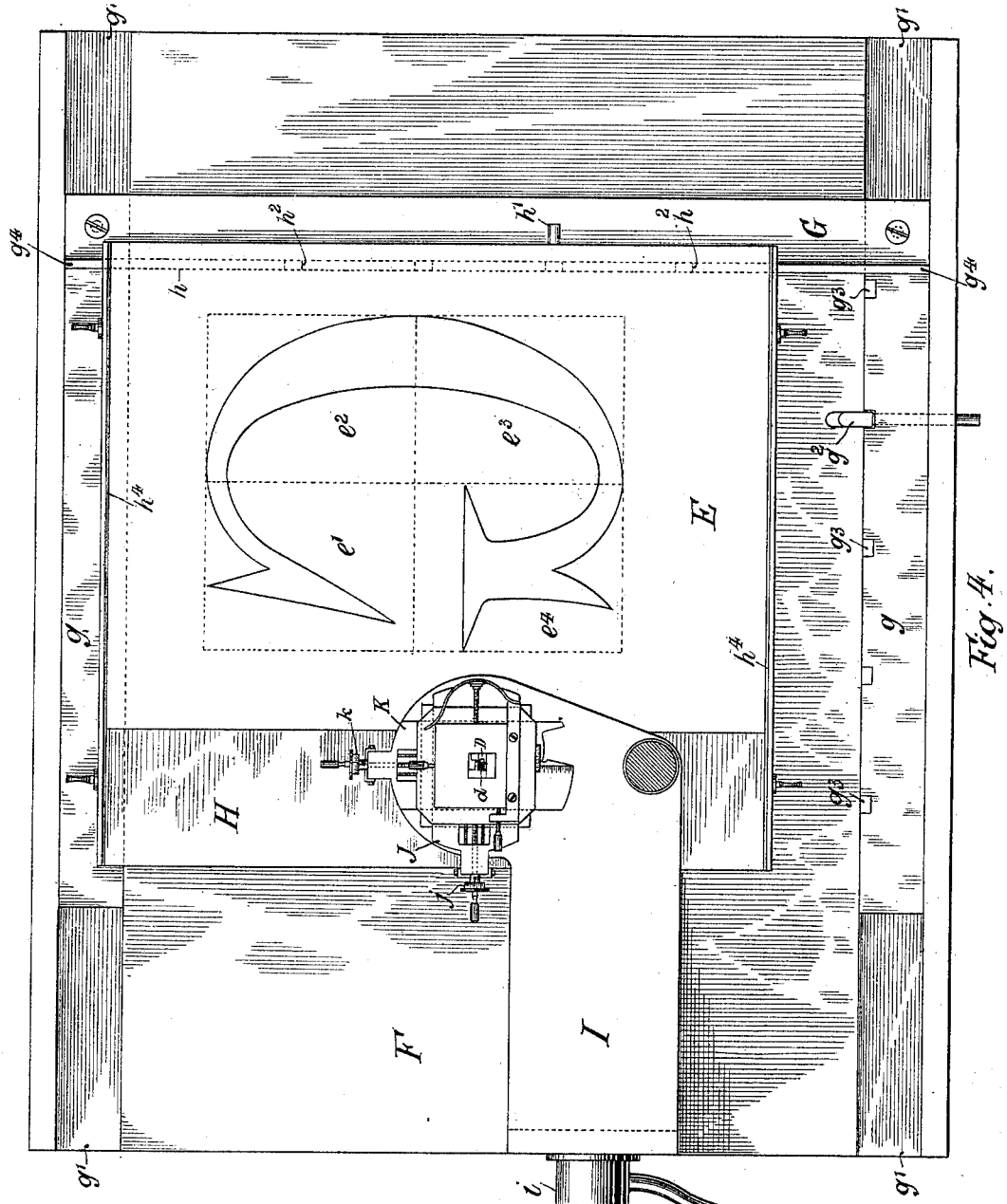

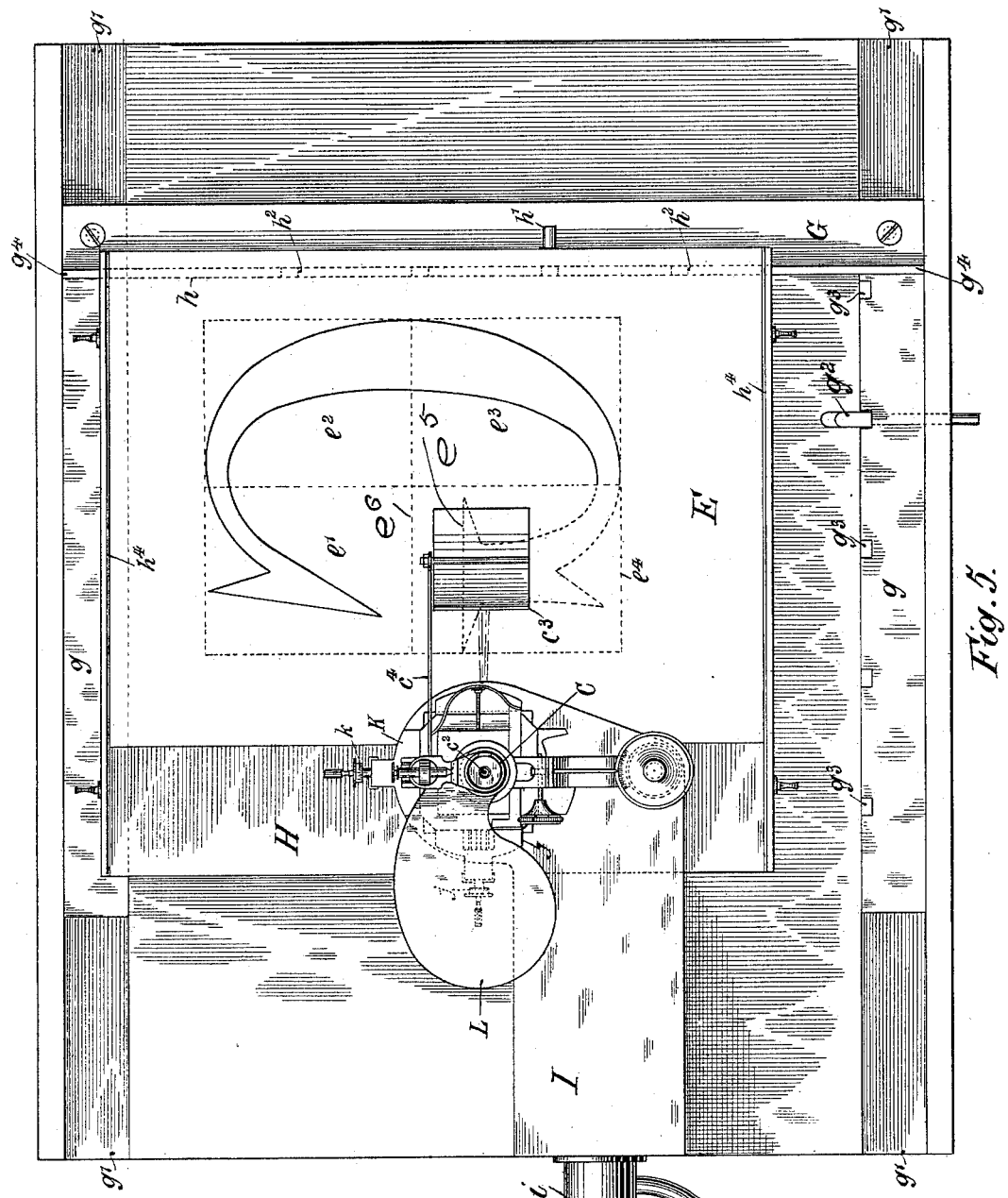

UNITED STATES PATENT OFFICE.

FRANK H. PIERPONT, OF HARTFORD, CONNECTICUT.

APPARATUS FOR FACILITATING DELINEATION OF OUTLINES OF TYPE-FACES, &c.

SPECIFICATION forming part of Letters Patent No. 600,292, dated March 8, 1898.

Application filed August 5, 1897. Serial No. 647,245. (No model.) Patented in England October 21, 1896, No. 23,397.

*To all whom it may concern:*

Be it known that I, FRANK HARRISON PIERPONT, a citizen of the United States, and a resident of Hartford, in the State of Connecticut, but at present of Kant Strasse 156, Charlottenburg, Berlin, W., in the German Empire, have invented certain new and useful Improvements in Apparatus for Facilitating the Delineation of the Outlines of Type-Faces and other Objects, (for which I have obtained the following patent: Great Britain, No. 23,397, dated October 21, 1896;) and I do hereby declare that the following is a full, clear, and exact description of the invention, reference being made to the accompanying drawings, which are to be taken as part of this specification and read therewith and one which will enable others skilled in the art to which it appertains to make and use the same.

My invention relates to improvements in apparatus for facilitating the delineation of the outlines of type-faces and other objects; and it consists in a particular combination of optical and mechanical devices.

It has already been proposed to utilize a microscope for the purpose of enlarging the details of a surface previous to its delineation being attempted and to combine with such microscope a camera lucida, as in the well-known drawing-camera, in order that the rays of light from the said surface and from that upon which the delineation is to be made may meet in the draftsman's eye and produce there what is practically one image as distinguished from two separate ones; but no provision has yet been made for eliminating the spherical aberration, which is always present to a greater or smaller degree in a microscopic image. This aberration makes itself apparent at a certain distance from the center of the field and increases in amount with the distance of the point under observation from that center. Its reproduction in the delineation is of course fatal to the accuracy of the latter.

The object of the particular combination above mentioned is to provide an automatic check upon the amount of aberration in the delineation. It is attained, as far as the optical part of the said combination is concerned, by placing in the field of the microscope only a definite portion of the original (so correspondingly restricting the surface of the paper or whatever is the material upon which the delineation is to be made in the image on the retina) and by following that with a second and like portion of the original (such second portion being the one adjacent to the first one in any given direction) and a second and like portion of the paper, being the one likewise adjacent in the same direction to the first portion thereof. The delineation on the paper of the first portion of the original reproduces the aberration present in the microscopic image. Let it be assumed that the field is square. A maximum degree of aberration will make itself apparent where the lines of the delineation touch the edges of the inclosing square on the paper; but the next portion of the original is moved into the field only so far as to bring that edge of it which immediately adjoins and follows the first portion into the central portion of the field—that is, into that part of it where there is no aberration. The delineation of the said edge will be true and indicate exactly the degree of aberration reproduced in the first portion of the delineation. This portion is then corrected. Thus throughout the entire process of delineation there will be a portion of it detecting and indicating the amount of aberration in the one immediately preceding it and consequently providing for its correction.

The invention does not in any way limit me to the area of the portion of the original admitted into the field at each adjustment of such original. That is a matter to be decided according to circumstances. It is obvious that the more the area of the original is divided the more accurate will be the finished delineation, for the reason that each subsequent division brings with it its own capacity for checking the delineation of the preceding one. It is recommended that the divisions shall be equal throughout; otherwise a greater degree of accuracy will obtain in one part of the delineation than in another.

In order that my invention and the means by which it is to be carried into effect may be thoroughly understood, I will now describe it and them in detail, referring in so doing to the accompanying figures, which are to be taken as part of this specification and read therewith, and in which like parts are marked throughout with the same reference-letter.

Figure 1 is a diagrammatic representation of the optical elements of the improved apparatus. Fig. 2 is a front elevation of the entire apparatus. Fig. 3 is a side elevation corresponding therewith from the left. Fig. 4 is a sectional plan taken along the line 4 4 of Fig. 3. Fig. 5 is a plan corresponding with Figs. 2 and 3.

The optical part of the combination consists of a microscope A, an illuminator B of any suitable type, and a camera lucida C. The illuminator may be either a prism in the microscope itself between the eyepiece $a$ and the objective $a'$, receiving rays of light through an aperture $a^2$ in the microscope-tube and deflecting them down upon the original D, or it may be an ordinary condenser. The camera lucida is arranged above the microscope as follows: There is a prism $c$ in the eye-point of the eyepiece $a$, so placed that its oblique face stands at an angle of forty-five degrees with the axis of the instrument as well as with the field. This surface is silvered, so as to convert it into a mirror. A second prism $c'$ is cemented to the former, the two forming a cube. There is a small aperture $c^2$ in the silvering capable of passing the rays from the microscope image to the eye. The aperture $c^2$ is shown in Fig. 1 as a black dot. Over the paper E and opposite the mirror above described there is supported a second and plane mirror $c^3$ at the same angle and over that portion of the paper to be dealt with. This mirror is conveniently (and preferably) supported by an arm $c^4$, springing from the eyepiece $a$. The optical part just described constitutes what is generally known as a "drawing-camera."

It is to be noted that there is no limit imposed by the invention upon the nature of the substance upon the surface of which the delineation is made. It may be either paper, the delineating instrument being a pencil, or it may be any plastic or other substance capable of being cut or carved or modeled, the delineating instrument being always adapted to the nature of the said substance. The color of the substance cannot have any effect in diminishing the distinctness of the image on the retina, for the reason that there is always a stronger light directed upon the original than finds its way to such substance. The internal construction of the microscope is modified as may be required in view of rays which are not required in the eye for the purpose of delineation. For instance, in the case of a type the inclined shoulders $d$ and the top of the body $d'$ are of no moment. They may be disregarded. Only such rays of light as fall upon the face are reflected to the eye. All those which fall upon the inclined shoulders or upon the top above mentioned are reflected to and absorbed by the walls of the instrument, they being properly constructed for that purpose. The completed delineation is included within a rectangular area which accurately represents the top of the body $d'$ of the type, from which latter it had been copied, and it is so situated that its inclination to and its distance from the foot line and side lines are exactly in accordance with the scale to which it is drawn.

The mechanical part of the combination consists principally of a firm base F, a pair of traversing tables G H, and a bracket I, springing from the said base and supporting the microscope at a suitable height above the said base and tables, and a pair of traversing slides J K.

The bottom table G is rather smaller than the top of the base F and fits down upon it. It is capable of a reciprocating linear motion upon the said base in one direction, while the top table H is capable of a similar motion upon it—the bottom one, G—but at right angles with that of the latter upon the base F. Both these motions are provided for in the well-known way by means of ridges and grooves, each table being fitted with a releasable detent. $g$ $g$ are a pair of ridges fast upon the bottom of the table G close to the respective front and rear edges and engaging in corresponding grooves $g'$ $g'$, which extend the full length of the base F. $g^2$ is a spring-actuated detent presenting a push-piece beyond the front of the base F. It works in a suitable recess standing at right angles with the motion of the table G. $g^3$ $g^3$ are a series of equal and equidistant notches in the inner face of the respective ridge $g$, and in each of them the detent $g^2$ engages when the two are opposite each other, thereby locking the table G in the corresponding position.

The top table H is smaller than the bottom table G and fits down upon it. It has a groove $h$ in its under side parallel with the direction of its intended motion. This groove fits over a ridge $g^4$ upon and fast to the table G. $h'$ is an automatic detent, and $h^2$ $h^2$ a series of equal and equidistant notches in the ridge $g^4$ for locking the table H in any position corresponding with that of one of the said notches in the same way as the detent $g^2$ locks the table G. The notches $h^2$ are at the same distance apart as the notches $g$. The sheet of paper E is stretched across the table H and held down thereupon by clipping-strips $h^4$ $h^4$ along the front and back edges of the said table.

The bracket I is detachably held to the base F by a clamping-screw and nut $i$. The screw passes through a vertical slot $i'$ instead of a hole of its own size in the vertical portion of the bracket, and that portion fits in a vertical groove $i^2$ in the end of the base F in order that the height of the microscope above the table H may be easily adjusted. For exactness of adjustment the microscope is fitted with the usual rack device.

The stage of the microscope A consists of a pair of slides J K. These are respectively the counterparts of the tables G and H above described. The slide J is movable upon the frame of the stage in the same way and direction as the table G upon the base F and the slide J upon the slide K in the same way and direction as the table H upon the table G. They are respectively fitted with traversing and detent mechanisms $j$ $k$. These latter must be of considered exactness. They are coördinated with the series of notches of the tables G and H, respectively, in such a way that a unitary or single motion of one table—i. e., from one notch to the next in the respective series—bears the same relation to a unitary or single motion of the respective slide J or K, as the case may be, as the size of the microscopic image bears to the size of the original. Suitable devices of any convenient kind are fitted to the pair of slides for holding the type D or whatever the original may be in position to the top slide J.

Exact correspondence between the motion of the slides J K and the tables G H, respectively, will result in exact correspondence of dimension between original and delineation.

There is a constant relation between the motions of the tables G H and the slides J K on the one hand and the dimensions of the projected image on the paper in view of those of the original on the other hand. Thus if the linear dimensions of the delineation are to be six times those of the original the motions of the table G H must at each adjustment be six times those of the slides J K, respectively.

When the object to be delineated is rectilinear, with lines running parallel to the movement of the tables and without fine divisions capable of being embraced in one field of the microscope, either dimension of the projected image may be increased or decreased by a corresponding increase or decrease of the motion of the respective table G or H, as the case may be, in view of the motion of the respective slide J and K. The width only of the projected image may be increased or decreased by altering accordingly the angle of forty-five degrees described above as that at which the mirror $c^3$ normally stands. Further, any projected image may be either increased or decreased by moving the camera lucida farther from or nearer to the paper.

L is an adjustable and detachable obscurer to save the observer the trouble of closing one eye.

The figures indicate that the type D is a "G," and that it is being delineated by fourths of its area at a time. The first adjustment of the said type under the microscope puts, say, the top left-hand corner of the type-face in the center of the field. The corresponding part of the first quarter $e'$ of the delineation will be practically accurate, while the aberration will make itself increasingly apparent in the direction of the right and bottom edges of the said quarter. The type is next moved to the left till the top left-hand corner of the second quarter is in the center of the field, the tables G and H being moved accordingly. The projection of the second quarter of the type checks the aberration in the first quarter $e'$ of the delineation and shows the amount of it, so that it can be removed by erasing as much of the delineation as is inaccurate and redrawing to the projection of the top left-hand corner of the second quarter. The second quarter $e^2$ of the delineation will be practically accurate where it joins the first quarter $e'$, and so on with the third and fourth quarters $e^3$ $e^4$. The full and dotted lines of the delineation indicate that the first three quarters have been delineated and corrected and that the projection of the fourth quarter of the type has just been effected. In the case of the "G" the top or last edge $e^5$ of the fourth quarter of the delineation does not touch the bottom edge $e^6$ of the first quarter $e'$. These last-mentioned edges may be corrected by bringing the corresponding parts of the type D successively into the center of the field and adjusting the two tables G and H accordingly. The capacity of the pair of slides J and K and of the pair of tables G and H for mutually corresponding adjustments may be carried as far in the direction of fineness as the nature of the objects to be delineated may require. The above-mentioned capacity leads up to another—viz., the capacity for dividing and subdividing the field with the original in it as well as the paper coördinately therewith. It is this latter capacity which is the distinguishing feature of the present invention and the source of the check upon aberration which that invention provides. The drawing-cameras hitherto known have not possessed it. They have only one field and can only give one projection.

I claim—

1. The combination with a microscope and camera lucida, of adjustable mechanism for coördinately dividing the field of the former and the surface upon which the latter projects the image which it receives, for the purpose of eliminating spherical aberration from the projected image.

2. The combination with a microscope and camera lucida, of a pair of slides forming practically the microscope stage, and a pair of tables standing under the mirror of the camera lucida, the said slides capable of movement independently of each other in parallel planes, and the said tables likewise capable of movement independently of each other in parallel planes, for the purpose of dividing up the microscope field and the paper or its equivalent.

In witness whereof I have hereunto affixed my signature, in presence of two witnesses, this 21st day of July, 1897.

FRANK H. PIERPONT.

Witnesses:
 HENRY HARPER,
 CHARLES H. DAY.